Feb. 11, 1930.  P. A. COONEY  1,746,638
METHOD OF AND APPARATUS FOR MEASURING PRODUCTION
Filed Sept. 1, 1922  6 Sheets-Sheet 1
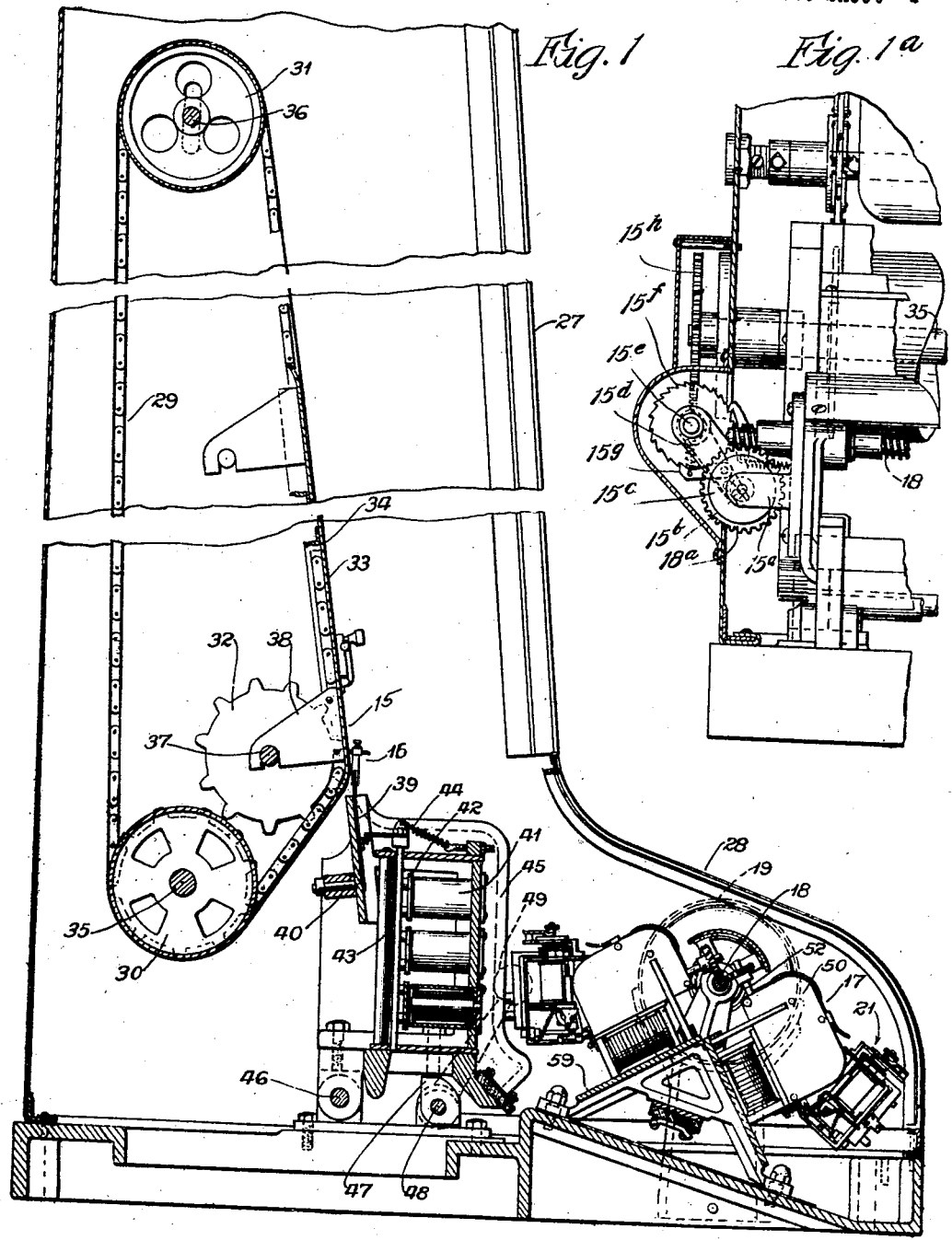

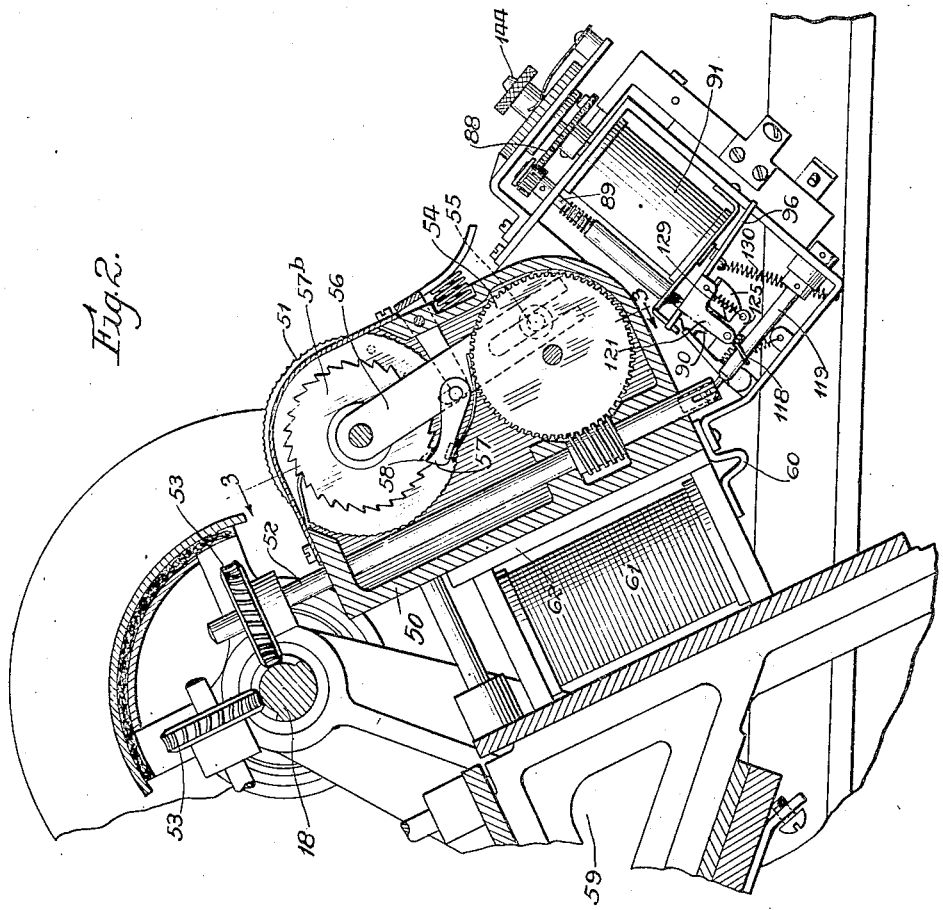

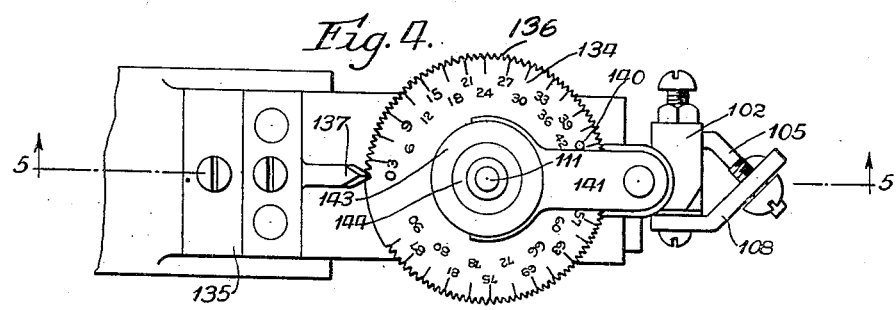

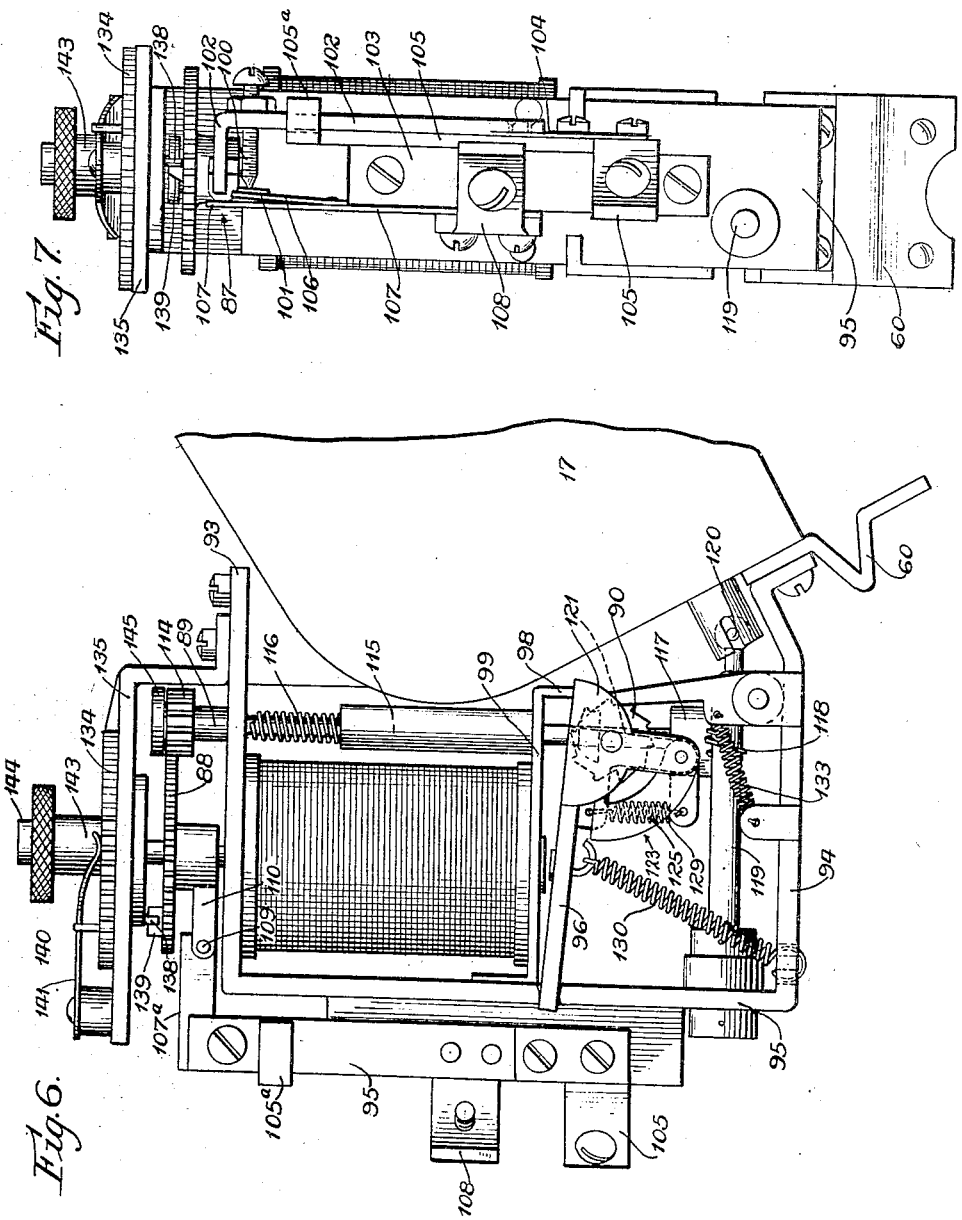

Feb. 11, 1930.  P. A. COONEY  1,746,638
METHOD OF AND APPARATUS FOR MEASURING PRODUCTION
Filed Sept. 1, 1922    6 Sheets-Sheet 5
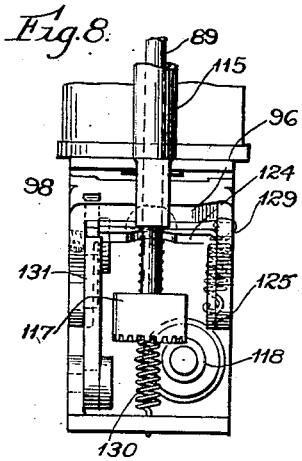
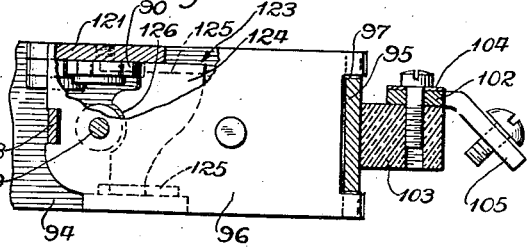
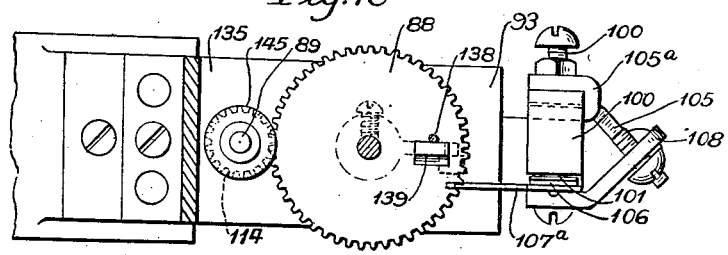
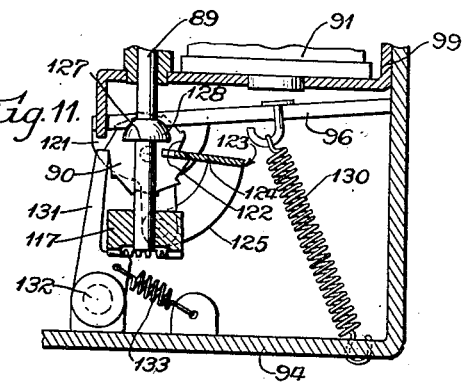
Inventor:
Peter A. Cooney.
By Chindahl, Parker & Dawson
Attys Feb. 11, 1930. P. A. COONEY 1,746,638
METHOD OF AND APPARATUS FOR MEASURING PRODUCTION
Filed Sept. 1, 1922 6 Sheets-Sheet 6
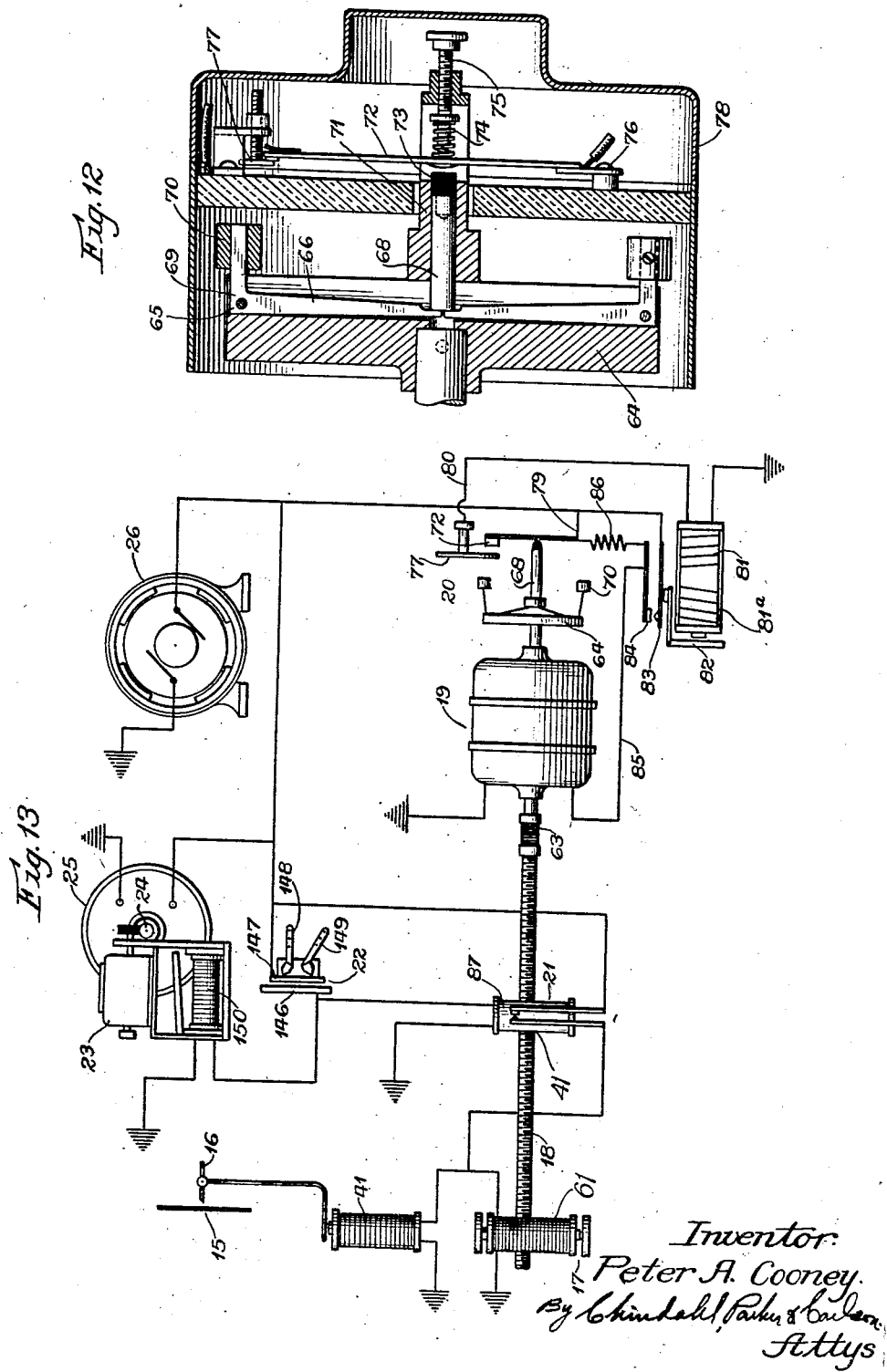
Inventor:
Peter A. Cooney.
By Chindahl, Parker & Carlson
Attys Patented Feb. 11, 1930

1,746,638

UNITED STATES PATENT OFFICE

PETER A. COONEY, OF CHICAGO, ILLINOIS, ASSIGNOR, BY MESNE ASSIGNMENTS, TO ELECTRECORDER CORPORATION, OF DOVER, DELAWARE, A CORPORATION OF DELAWARE

METHOD OF AND APPARATUS FOR MEASURING PRODUCTION

Application filed September 1, 1922. Serial No. 585,593.

The general aim of this invention is to provide a means which is capable of measuring and registering, second by second, the productive capacity of one or more machines, instantly disclosing to the management of a plant in which such a means is employed every deviation from 100 per cent efficiency in the operation of the plant equipment as a whole as well as each unit thereof.

Numerous attempts have heretofore been made to produce an efficient production measuring machine, but in all cases, so far as I am aware, the means employed have proven of no real commercial value by reason of certain deficiencies, chief among which is their inability to function with sufficient accuracy to produce records of a dependable character.

The general object of my invention, therefore, has been to overcome the deficiencies of prior devices, by the production of a machine capable of wide application and operable with exceeding accuracy to record such facts relating to the productive capacity of the shop equipment as will enable the management to maintain a high degree of efficiency in the plant.

Inefficiency in the operation of plant equipment is due largely to idle periods, including those which may be necessary but of excessive duration, and those which may be wholly unnecessary and hence entirely avoidable. For example, in operating a drill press, a punch press or any machine tool which must be stopped at the completion of each operation, an idle period necessarily ensues in which the work previously operated upon is withdrawn and new work inserted. Such idle period may properly be longer than the actual producing period of the machine but nevertheless since it is unavoidable, it should be shown as producing time upon the records of the measuring means. On the other hand, when the duration of the idle period is excessive, the records must show such excessive producing time as idle time. In other words, the measuring means must be capable of differentiating between the legitimate time and the avoidable time during which the tool is at rest, giving credit for the legitimate time only, and indicating the duration of the period over and above that which is legitimate. Moreover, the measuring means must be capable of functioning with a high degree of accuracy. This will be clear from the fact that while the excess idle time may be only a fraction of a second in duration, when it occurs with great frequency, it may amount to several hours over the course of a day. Consequently, if the records produced are to be accurate such excessive idle periods, however slight, must be taken into account.

An important object of the invention, therefore is, to provide a machine which is capable of measuring the productive capacity of the shop machine allowing for those idle periods only which in the opinion of the management are strictly legitimate, and which at the same time is also capable of adjusting itself to the conditions of operation so as to give the operator full credit whenever he is able to reduce the idle periods allowed.

Still another object of my invention is to provide in a machine of the character stated, a means for registering accurately the time during which the shop machine is in productive operation; and a means for registering efficiently the total number of operations. I attain these results by the utilization of mechanical power for actuating the registering devices, the latter being controlled electromagnetically by the operation of the shop machine.

A general object of the invention is to provide a construction and arrangement of the parts such as will insure the efficient operation thereof, including the elimination of clutch connections and other forms of devices introducing elements of uncertainty and inaccuracy.

In the accompanying drawings I have illustrated one embodiment only of the invention, but it is contemplated that various changes may be made in the form, construction and arrangement of the parts by those skilled in the art without departing from the spirit and scope of the invention as expressed in the appended claims.

For the sake of convenience, I have herein designated my improved machine a productometer, and the machine tool or other equipment whose productive capacity is to be measured is designated "shop-machine."

Figure 1 of the drawings is a fragmentary vertical sectional view through my productometer. Fig. 1ª is a fragmentary front elevation illustrating the connection between the motor drive shaft and the recording chart. Fig. 2 is a fragmentary vertical sectional view through one of the time registering devices and its drive mechanism and showing in elevation the device which I employ by means of which the operation of the recording and registering devices is controlled by the operation of the shop machine. Fig. 3 is a sectional view through such device taken in the plane of line 3 of Fig. 2. Fig. 3ª is a detail perspective view of the actuating means detached. Fig. 4 is a detached top plan view of the controller device shown in Fig. 2. Fig. 5 is a vertical sectional view through said device and illustrating its connection with one of the time totalizing devices, the view being taken substantially in the plane of line 5—5 of Fig. 4. Fig. 6 is a side elevation of the device shown in Fig. 5 but looking from the opposite side thereof. Fig. 7 is a front elevational view of said device. Fig. 8 is a vertical sectional detail view of a portion of the controller device. Fig. 9 is a fragmentary sectional view taken in the plane of line 9—9 of Fig. 5 with one of the parts broken away to illustrate details of construction. Fig. 10 is a fragmentary horizontal sectional view taken in the plane of line 10—10 of Fig. 5. Fig. 11 is a fragmentary vertical sectional view showing the means illustrated in the lower portion of Fig. 5 but in a different operative position. Fig. 12 is a vertical sectional view of the governor which I employ for maintaining the speed of the actuating motor constant. Fig. 13 is a diagrammatic view of the complete mechanism illustrating the electromagnetic circuit.

Referring first to Figs. 1 and 13, the machine comprises generally a chart mechanism 15 with which is operatively associated a stylus 16 and operating means therefor, the two mechanisms together constituting a device for recording the productive and idle periods. 17 designates generally the time totalizing mechanism which is arranged to be mechanically driven by power derived from a shaft 18 driven in the present instance by an electric motor 19 at a high rate of speed and under the control of a governor mechanism 20. The operation of the recording and registering devices 16 and 17 is controlled by controller mechanism 21, the latter in turn being controlled by a switch 22 actuated in the operation of the shop machine. 23 designates the counting mechanism which registers the number of operations of the shop machine. This mechanism is also controlled by the switch 22. 24 is a drive shaft for mechanically actuating the mechanism 23, said shaft being driven by means of an electric motor 25. 26 designates a source of electric energy for the various mechanisms.

Herein I employ the terms "indicating device" and "indicating" as generic terms to denote the chart and stylus mechanism, the time totalizer mechanism and the counting mechanism; and, it will be understood that while I have herein shown and described one only of each of the registering devices 17 and 23, that one such device, is provided for each machine whose production is to be measured. The recording chart mechanism is common to all of the machines.

The several mechanisms, with the exception of the counting mechanism and their operating means, are preferably enclosed within a casing supported in any suitable or convenient manner and comprising a main upright portion 27 having at its lower end a forwardly projecting portion 28, the forward wall of the casing being constructed so as to render the various mechanisms visible to an attendant stationed in front of the machine. The counting mechanism may be supported in a convenient way (not shown) at one side of the casing.

The chart mechanism 15 of the period recording device comprises a chart in the form of an endless belt running over the usual end rolls and actuated by a chain 29 running over a lower sprocket 30, an upper sheave 31 and an idler 32, the latter being positioned somewhat forwardly in the case so as to guide the belt behind a shelf or table 33 over which slides the chart indicated at 34 (Fig. 1). The sprocket 30 is fixed upon a shaft 35 which constitutes the drive shaft for the mechanism and is operatively connected with the main drive shaft 18 in a manner to be presently set forth. The upper sheave 31 is mounted upon a shaft 36 which is adjustable by suitable means, forming no part of this invention, toward and from the shaft 35 to vary the tension upon the belt. The idler 32 may be mounted upon a shaft 37 carried by brackets 38 extending rearwardly from the table 33.

The chart mechanism is arranged to be driven directly from the shaft 18 by the means shown in Fig. 1ª. Obviously by reason of the high rate of speed at which said shaft operates and the slow speed at which the chart must operate, the connection therebetween must provide for a substantial reduction. The means which I prefer to employ comprises a worm wheel 18ª meshing with the worm of the shaft 18 and suitably mounted in the framework upon a bracket 15ª. Said wheel is mounted upon a shaft 15ᵇ rigid therewith and carries a disk 15ᶜ provided with a pin eccentrically located thereon. An arm 15ᵈ has a forked end engaging said pin and its opposite end is loose upon a shaft 15ᵉ carrying a ratchet wheel 15ᶠ. A spring pressed pawl 15ᵍ is pivoted upon the arm 15ᵈ and engages the ratchet wheel 15$^b$, and said shaft is connected by a worm gear train 15$^h$ with the shaft 35 of the chart mechanism. The parts are so proportioned and arranged that the chart is arranged to travel at a rate depending upon the scale provided on the chart to indicate hours and minutes of operation.

The means for actuating the stylus 16 to make the desired record upon the chart 34 may be of any suitable or preferred construction. In the present instance it comprises generally an arm 39 pivotally mounted at its lower end as at 40 and carrying the stylus or marking device at its upper end. Said arm is arranged to be swung laterally by the operation of an electromagnet 41 having an armature 42 arranged to rock an upright shaft 43 against the action of a coiled contractile spring 44. The magnet 41 for the several marking devices, and their associated parts are preferably supported as a unit within a suitable framework 45 and upon a horizontal axis 46 located rearwardly of the center of gravity of the mechanism. Normally, therefore, the mechanism tends to fall forwardly, withdrawing the stylus from the chart, but is held in its operative position by means consisting of one or more cams 47 fixed upon a shaft 48 having an operating handle 49 (Fig. 1). Said cam means is adapted to be swung by the handle 49 into engagement with the framework 45, forwardly thereof, whereby to position properly the marking devices in recording position.

The time registering or totalizer devices 17 (Figs. 2 to 3$^a$) each comprises a casing 50 having a pair of totalizer wheels 51 arranged to be driven mechanically by the shaft 18 and suitably numbered to indicate the time in minutes and seconds during which a shop machine is in operation. The means whereby I am thus enabled to drive the totalizer wheels at an extremely low rate of speed from the high speed shaft 18, consists of a driving spindle 52 having a worm wheel 53 meshing with the shaft 18, the latter constituting the worm. The spindle 52 in turn has a worm gear connection with a disk 54 carrying an eccentrically located pin 55 with which engages the free end of an arm 56 pivoted concentrically with the wheels 51. A pawl and ratchet mechanism 57 consisting of two integrally connected pawls 57$^a$ one slightly longer than the other and a pair of ratchet wheels 57$^b$ is actuated in the rocking movements of the arm 56 to impart motion to the totalizer wheels. One of said wheels is given an impulse once for each oscillation of the arm 56, whereas the other one of said totalizer wheels is given an impulse once for each rotation of the first mentioned wheel. This is accomplished through the provision of a deep tooth 58 in one of the ratchet wheels. The arrangement is such that the longer one of the pawls 57$^a$ engages with its ratchet wheel 57$^b$ once for each reciprocation of the arm 56, and thus moves said ratchet wheel and its corresponding seconds wheel forward one step; and at the end of a complete revolution of the seconds wheel, this same pawl enters the deep tooth 58 which allows the other and shorter pawl to move into engagement with its ratchet wheel and move the corresponding minutes wheel ahead one step, but one step only until the seconds wheel is rotated through another cycle. This mechanism forms the subject matter of a copending application, Serial No. 633,052, filed April 19, 1923, to which reference is made for a more complete understanding thereof.

The time totalizer mechanism of the machine is mounted upon a support 59 in the form of the letter A, the several devices for totalizing the operating time in the case of the several shop machines being preferably arranged in staggered relation upon opposite sides of this support, as shown in Fig. 1. Each device is secured to the support by means of a leaf spring 60 which normally tends to swing the device, the spring being adapted to serve as a hinge for this purpose, to hold the worm wheel 53 upwardly and outwardly away from driving engagement with the drive shaft 18. Below the device, between it and the side of the support upon which it is mounted, is interposed an electromagnet 61 having an armature 62 rigid with the casing 50 of the device. The arrangement is such that when the magnet 61 is energized the wheel 53 is moved into mesh with the worm of the shaft 18 to actuate the drive spindle 52 of the device.

The motor 19 is arranged to drive the shaft 18 at a high rate of speed through the medium of a relatively stiff coiled spring 63 the opposite ends of which are secured to the drive shaft of the motor and to the shaft 18, respectively, to form a coupling between these two shafts. The speed of the shaft is maintained substantially constant through the medium of the governor mechanism 20 which comprises a disk 64 (Figs. 12 and 13) fixed upon the motor shaft and having pivoted thereto a pair of bell crank levers 65 pivoted near the periphery of the disk and having radially extending arms 66 engaging a pin 68 alined with the motor shaft. Said levers also comprise arms 69 extending in a direction generally parallel to the pin 68 and carrying weights 70. These weights, under the action of centrifugal force, swing the lever 66 to move the pin 68 outwardly, said pin being slidable through a bearing 71 rigid with the disk 64. As the pin thus slides outwardly it engages a movable switch member 72 through the medium of an insulated tip 73 and against the action of a coiled compression spring 74 mounted upon a screw 75 for purposes of adjustment. The lower end of the switch member 72 is fixed as at 76. Its upper end normally engages a stationary contact 77, the whole being enclosed within a suitable housing 78.

Referring now to Fig. 13, the switch member 72 is connected by means of a conductor 79 directly with the source of electric energy provided by the generator 26; and the stationary contact 77 is connected through the medium of a conductor 80 with an electromagnet 81. The latter has an armature 82 in the form of a bell crank lever having insulated contact with a movable switch member 83 adapted to engage a stationary contact 84 connected by means of a conductor 85 with the field of the electric motor 19. Normally the circuit through the contacts 72 and 77 is closed, energizing the magnet 81 so that the circuit through the contacts 83 and 84 is also closed, with the result that energy is supplied directly to the motor 19. When, however, the speed of the motor exceeds a predetermined rate, the weights 70 acting through the pin 68 break the circuit closed by the contacts 72 and 77. In this event, a resistance element 86 is interposed in the connection between the contact member 72 and the conductor 85, thus retarding the speed of the motor. Preferably I employ a copper sleeve 81$^a$ around the magnet 81 which serves to retard the opening of the switch 83, 84 through the action of residual magnetism. Consequently, the motor is permitted to attain a sufficiently high speed before it slows down to effect a clean break at the switch 72, 77. This construction serves to prevent arcing at the contacts due to the fluttering of the movable contact which would naturally result as the speed increased to the changing point. It will be observed therefore that while the governor mechanism produces, strictly, a constantly fluctuating speed of the motor, such fluctuations are substantially uniform, and therefore an average or mean speed which is substantially constant is maintained. It will also be evident that because the shaft rotates at a high rate of speed, and the various devices actuated thereby are driven at an exceedingly low rate of speed, the variations in the speed of the shaft when transmitted to the time totalizing devices render any inaccuracies practically negligible.

The controller mechanism 21 for governing the operation of the period recording device 15, 16, and of the time registering device 17, is in turn controlled by the operation of the shop machine through the medium of the switch 22 as above set forth. Said mechanism 21 comprises primarily a switch 87 (Fig. 13) which is normally closed and which is arranged to be broken after the expiration of a predetermined length of time through the operation of electromagnetic means controlled by the operation of the shop machine through the switch 22. The means for determining the length of the period at the end of which the switch 87 is opened, includes a uniformly travelling member in the form of a disk 88 having a gearing connection with a spindle 89 which in turn has an operative but disengageable connection with the drive shaft 18 through the medium of the spindle 52 of the time registering device. A controller member in the form of a ratchet wheel 90 is arranged to be actuated under the control of the shop machine so that after a predetermined number of operations of the shop machine have been completed, the travelling member 88 is disconnected from the driving means whereupon it assumes its initial position for the next operation. The arrangement is such that if the predetermined number of operations of the shop machine are completed within the time allowed, the switch 87 remains closed; but if the time required to complete such predetermined number of operations exceeds the predetermined minimum, the switch 87 is opened as the member 88 approaches the end of its travel, with the result that the registering devices are stopped.

In its details the controlling mechanism for the recording and registering devices 16 and 17 comprises an electromagnet 91 mounted in a U-shaped frame 92 (Fig. 5), the open side of which is secured upon the outer end of the time totalizer casing 50. This frame thus comprises two spaced horizontal portions 93 and 94 connected by an upright portion 95. Pivoted upon the latter below the magnet 91 is a plate 96 constituting the armature of the magnet, the plate being pivoted at its outer end as at 97 and guided for up and down movement at its inner end by a downturned portion 98 of a bracket 99. The latter is secured at its outer end to the upright portion 95 of the frame. The electromagnet 91 is supported between this bracket 99 and the upper arm 93 of the frame.

Referring to Fig. 7, the switch 87 is located at the forward side of the frame and comprises a pair of contacts 100 and 101. The former is in the form of a screw carried by the upper end of a bar 102 secured upon one side of a block 103 which is fastened to the upright frame member 95. Said bar 102 is secured to the block 103 through the medium of a leaf spring 104, and the lower end of the spring is secured between the lower end of the bar and a terminal bracket 105. The contact 101 is permanently magnetized. It is located upon the opposite side of the block 103 and is carried by the upper end of a thin spring strip 106 secured at its lower end to an arm 107. The latter is fastened to the block 103 by a terminal 108, and at its upper end it extends horizontally inwardly as at 107$^a$ (Fig. 6) into the path of movement of a pin 109 carried at the free end of an arm 110 which is rigid with the travelling member 88. The upper end of the arm 102 is bent horizontally, and normally contacts the upper end of the arm 107. It will be seen, therefore, that as the pin 109 engages the upper end of the arm 107 to move the contact 101 away from the contact 100, the arm 102 will continue to adhere to the arm 107 by virtue of its magnetic attraction therefor. Consequently, the upper end of the arm 102 will be moved a short distance with the arm 107. The arm 102, however, is limited in such movement by the upper end of the terminal bracket which is shaped to provide a U-clip 105ª (Figs. 6, 7 and 10), said clip being of a size to permit of a slight swinging movement of the arm 102 (broken lines Fig. 7). When the arm 102 thus becomes limited in its movement with the arm 107, and comes to stop, the force of the magnetism is suddenly overcome by the moving spring 106, whereupon a clean break ensues.

It will be apparent that the travelling member 88 constitutes a controlling means for the recording and registering devices 16 and 17 through its circuit breaking function. In the present instance it is in the form of a disk fixed upon a pin 111 journaled in the core 112 of the electromagnet 91. The member 88 is provided at its periphery with spur teeth 113 which mesh with an elongated pinion 114 fixed upon the upper end of the spindle 89. This spindle 89 it will be remembered, has a disengageable connection with the driving means, and for this purpose is mounted for up and down movement, being journaled in the upper arm 93 of the frame and in a sleeve 115 carried by the bracket 99. A combined torsion and tension spring 116, secured at its opposite end to the sleeve 115 and the spindle 89, serves to resist upward movement of the spindle. Also rotary motion of the spindle in a clockwise direction (Fig. 5) winds the spring so as to store power therein for a purpose hereinafter set forth. The spindle terminates at its lower end a distance somewhat below the bracket 99 and has rigid therewith a crown gear 117. This is arranged to be driven by a worm 118 (Figs. 2, 6 and 8) rigid with a horizontal shaft 119 which is journaled at its rear end in the upright member 95 of the frame. It has a universal connection 120 at its inner end with the spindle 52 of the time totalizer mechanism. It will be observed that the didsconnection between the spindle 89 and the driving means is effected by moving the crown gear 117 out of engagement with the worm 118.

The means for thus lifting the crown gear 117 is under the control of the controlling member 90 which in turn is actuated under the control of the operation of the shop machine. To this end the armature 96 carries at its inner end and upon opposite sides a pair of depending arms 121 in which is journaled the controlling member 90. This member is in the form of a ratchet wheel having a deep tooth or notch 122. A latch member 123, which is also journaled in the arms 121 but below the member 90. This latch member comprises a horizontal portion 124 and opposite side portions or arms 125 which are pivotally mounted in the arms 121. The horizontal or plate portion 124 is shaped as shown in Fig. 9 to form a central recess or notch 126 which is adapted to receive the lower end of the spindle 89 and thus permit the plate to engage the periphery of the controlling member 90. Normally such engagement of the plate 124 with the ratchet teeth of the controlling member is such that it clears an annular shoulder 127 provided by an enlargement 128 on the spindle 89. When, however, the latch member engages in the deep tooth 122 of the controlling member, it is positioned inwardly a sufficient distance to engage under the shoulder 126. Consequently, while the movement of the armature 96 in the energization of the magnet 91 normally does not effect the position of the spindle 89, when the latch member engages in the tooth 122 the armature in its upward movement carries with it the spindle 89 and crown gear 117, thereby effecting the disconnection of the latter from the worm 118. The latch member normally tends to move into engagement with the ratchet wheel controller member through the operation of the coiled contractile spring 129, (Fig. 2) and upward movement of the armature 96 is resisted by a coiled contractile spring 130.

As above stated, the ratchet wheel controller member is actuated under the control of the operation of the shop machine. Thus I utilize the reciprocation of the armature 96 carrying with it the ratchet wheel to effect the rotation of the latter. To this end I employ a pawl 131 pivoted at 132 upon the arm 94 of the frame. A coiled contractile spring 133 tends to move the pawl into engagement with the ratchet wheel so that each time the latter descends from its uppermost position it is moved forwardly by the pawl 131 the distance of one tooth. Obviously by varying the number of teeth in the ratchet wheel the number of operations required to be completed within the predetermined time may be varied at will.

The means for predetermining the time within which the operations must be completed comprises an adjustable setting device in the form of a disk 134 journaled at the upper end of the pin 111 and in a top plate 135 carried by the upper arm 93 of the frame and in spaced relation to said arm. The outer peripheral edge of said disk is pro-provided with serrations 136 with which a pointer 137 carried by the plate 135 is adapted to engage to hold the disk in any desired position. Upon its under side the disk carries a depending pin 138 which is arranged to coact with a lug 139 upon the upper end of the travelling member 88. A pin 140 projecting upwardly from the disk 134 is adapted to engage with a spring arm 141 projecting radially inwardly from the disk, being secured at its outer end to the outer end of the plate 135 as at 142. The pin is so arranged that when it is moved into engagement with the arm 141 as shown in Figs. 4 and 5, it is in its zero position.

If now, it is desired to allow the operator of the particular shop machine whose production is being recorded, 15 seconds within which to complete ten operations, the disk is rotated through the medium of a knurled knob 143 to bring the number 15 upon the disk opposite the pointer 137 which acts to hold the disk in this position. In such movement, the disk is preferably raised slightly, being held against upward movement on the pin 111, and the member 88 is thus also raised. As the latter moves upwardly it engages a collar 145 fast upon the pinion 114 at the upper end of the spindle 89 so that an upward movement is thus also imparted to the spindle to disengage the crown gear 117 at its lower end from the worm 118. The spring 116 now acts to move the lug 139 into the position determined by the stop pin 138. The spring arm 141 serves to restore the parts to their normal position.

It will be remembered that the switch 87 is normally closed so that the totalizer mechanism is in operative engagement with the shaft 18 thus imparting rotation to the spindle 52. Immediately, therefore, upon the engagement of the crown gear 117 with the worm 118, the stop lug 139 on the controller member 88 begins to travel, and the rate of travel is at a uniform speed since it is driven from the main drive shaft 18. Simultaneously, the controlling member 90 is being rotated through the operation of the armature 96 upon each energization of the magnet 91, which occurs each time the switch 22 of the shop machine is closed, the arrangement being such that the switch is closed upon each productive operation of the machine.

Now, if the operator should fail to complete his required number of operations, for example ten, within the time allowed, namely 15 seconds, the travelling member 88 would at the expiration of the 15 seconds have carried the arm 110 with its stop 109 against the arm 107 to which the contact 101 is secured. At the end of such travel, therefore, the contact 101 is moved out of engagement with the contact 100, and the circuit including the magnets of the indicating devices 15, 16 and 17 broken causing said devices to come to a stop. On the other hand, if the operator should complete the necessary number of operations in the time allowed, the disengagement of the crown gear 117 from the worm 118 upon the last or tenth operation of the machine enables the spring 116 to restore the controller member 88 to its initial position for the next operation or series of operations.

Now referring to Fig. 13, the electrical connections will be understood. It will be seen that the opposite contacts 101 and 102 of the switch 87 are connected in circuit with the source of electrical energy 26 and the indicating devices 15, 16 and 17; and that the magnet of the controller mechanism 21 is connected in circuit with the shop machine switch 22. Consequently it will be apparent that the operation of the indicating devices is controlled by the switch 87 of the controlling mechanism and that the operation of said mechanism is in turn controlled by the operation of the shop machine switch 22.

The shop machine switch 22 may be of any suitable construction. Herein it is shown only diagrammatically as comprising a pair of spaced contacts 146 and 147, the latter being movable by either of two levers 148 and 149 one of which is arranged to be actuated by the machine automatically upon each productive operation, and the other one of which is arranged to be operated manually by the operator of the machine to break the circuit in case any of the operations of the machine are non-productive as, for example, in the case of a printing press when the operator fails to feed a sheet.

I have shown diagrammatically in Fig. 13, the means for counting the operations of the machine. This mechanism comprises an electromagnet 150 which is also arranged to be controlled by the shop machine switch 22. When this magnet is energized the counting device 23 is swung into engagement with the continually operating worm 24 driven by the motor 25. Said counting device is made the subject matter of a copending application Serial No. 494,426 filed August 22, 1921, now Patent No. 1,687,281, dated October 9, 1928.

The operation of my productometer may be summarized as follows:

The shop machine having been set in operation, the circuit through the coil of the magnet 91 of the controller mechanism becomes energized intermittently once for each productive operation of the machine. At the same time current flows thorugh the normally closed switch 87 to the magnet 61 of the time totalizer or time registering device 17 and the magnet 41 of the chart or period recording device 15, 16, it being noted that the latter circuit is independent of the operation of the shop machine. It is also assumed that the motor 19 has been set in operation and through the operation of the governor mechanism provided therefor, the speed of the shaft 18 is maintained substantially constant. Briefly, the operation of the motor governor is that normally the motor is in direct connection with the source of current and when the speed of operation exceeds a predetermined rate, the switch 77 is opened compelling the current to pass through the resistance coil 86 to the motor with the result that the speed of the motor is decreased. The coil 81 retards the opening of the switch 83, 84 and thus insures a clean break at the switch 72, 77.

It having been predetermined by the management that ten operations of the shop machine may be completed within 15 seconds, while at the same time allowing the operator unavoidable or legitimate idle periods such, for example, as the intervals occurring between operations required for the handling of work in and out of machine; the controller mechanism 21 is set by the manipulation of the knob 143 to position first the pin 138 a distance removed 15 seconds of travel from the point of opening the switch 87. The controller member 88 is now raised against the action of the leaf spring 141 into engagement with the collar 145 on the upper end of the spindle 89 so as to elevate the spindle and thus disengage the crown gear 117 from the worm 118. As a result, the controller member 88 is released to the action of the coiled spring 116 which operates to move the lug 139 into engagement with the stop pin 138. Upon the release of the knob 143 the spring 141 restores the crown gear into engagement with the worm 118. Consequently the member 88 immediately begins to travel at a uniform rate of speed from its position determined by the position of the pin 139 toward the movable arm 107 of the switch 87.

As the circuit through the coil 91 of the controller mechanism is closed by the operation of the switch at the shop machine, the armature 96 is intermittently moved upwardly and then drawn downwardly by the action of the spring 130; and in such downward movement of the armature the controller member 90 is advanced one step through the operation of the pawl 131. In the present instance said member 90 has ten teeth therein, the tenth one of which is the deep tooth 122. After the tenth productive operation of the shop machine, the latch member 123 is forced by its spring 129 into the deep tooth 122 and hence beneath the shoulder 127 formed on the spindle 89. Since the latch member is carried by the armature, the next upward movement of the latter while engaged with the shoulder 127 lifts the spindle 89 and hence lifts the crown gear 117 out of engagement with the worm 118.

If the operator completed his ten operations within the 15 seconds allowed, it will be apparent that the disengagement of the crown gear 117 will have taken place before the switch 87 is opened by the arm 110; and upon such disengagement of the spindle the spring 116 acts immediately to restore it to its initial position as determined by the pin 138. Therefore the indicating devices continue in operation and show continuous production. On the other hand, if the operator had failed to complete his ten operations within the 15 seconds allowed, it will also be apparent that prior to the disengagement of the crown gear 117 from the worm 118, the arm 110 would have reached the end of its travel, opened the switch 87, and broken the circuit containing magnets 61 and 41 of the time totalizer device 17 and the marking device 15, respectively. This breaking of the circuit to the magnet 61 effects the disengagement of the worm wheel 56 from the shaft 18, thus stopping the time totalizing device; and the deenergization of the magnet 41 of the marking device releases the stylus 16 to the action of its spring 44. The stylus, consequently, moves from an "operating" position laterally to an "idle" position, drawing a lateral or horizontal line on the chart; and it will be apparent that as the machine repeatedly fails to produce at the predetermined rate, the stylus will, for each operation of the machine, show a horizontal line. These lines, occurring in rapid succession, produce in effect a wide darkened line longitudinally of the constantly moving chart so as to indicate instantly to the management that the machine is not, for some reason, producing at the predetermined rate.

These devices therefore will, in the last case instanced, show the shop machine non-productive during the time following the expiration of the 15 seconds and the completion of the ten operations; whereupon the disengagement of the controlling member 88 from its driving means through the operation of the controller member 90 will permit the restoration of the member 88 to its initial position and a simultaneous closing of the switch 87 to restore the indicating devices to operation for the next period of 15 seconds.

It will be observed from the foregoing that my controller mechanism 21 for the indicating devices is controlled solely by the operation of the switch at the shop machine, and that the indicating devices are controlled solely by the controller mechanism. The result is that if the operator is able to increase the speed of production of the machine, the indicating devices will continue to function giving him credit for efficiency. Thus the chart mechanism will show continuous production, the time totalizer will record the time actually consumed, and the number of operations will be registered by the counting device. Former machines of which I am aware have employed in place of my controller mechanism a time limit switch controlled by the expiration of time instead of by the operation of the shop machine, with the result that in the case of the prior device the breaking of the circuit occurs only at the expiration of the set time and thus fails to give the operator due credit when he increases the efficiency of his machine and actually shows gross inefficiency or excess time consumed when the operator is really highly efficient.

On the other hand, if the speed of production falls below 100% efficiency after allowing for legitimate idle periods, the controller mechanism 21 will cause the chart mechanism to show the excess idle time consumed and the time totalizer will eliminate such time irrespective of its duration. Thus, it will be clear that my productometer differentiates between legitimate and avoidable idle periods.

The utilization of a high speed drive shaft for actuating the registering devices 17 and 23 is of maximum importance by reason of the substantial elimination of error which is further rendered possible by the elimination of frictional clutches and the like.

The time totalizer, it will be understood, serves to register accurately the total producing time, so that at the end of an operating period of a predetermined length, as, for example, a day, it can be ascertained what portion of that period was actually utilized in productive operation. The chart mechanism makes a graphic record of this producing time available for instant and ready reference and is obviously of a more permanent character than the record obtainable from the time totalizer.

It may also be observed that the construction and arrangement of the parts which I have provided renders the machine of a wholly practical character. In actual test it has proven itself to be of high efficiency, and obviously is capable of wide and varied usage for measuring the output of industrial machinery for the purpose of eliminating waste time and thus increasing the efficiency of plant management wherever employed.

I claim as my invention:

1. The combination of an indicating device, electromagnetic means for controlling said device including an electric circuit normally closed, and means for breaking the circuit to render the indicating device inoperative, said means including a secondary circuit having an electromagnet therein, a switch in said circuit controlled by the operation of the machine, said magnet having an armature intermittently actuated upon the closing of the circuit, a circuit breaker, a shaft rotating at a constant rate of speed arranged to drive said circuit breaker, a conrtolling member actuated by said armature and adapted upon the completion of a predetermined number of operations of the shop machine to effect the disengagement of the circuit breaker from said constantly driven shaft, said circuit breaker including a member adjustable to enable the setting of the time within which the predetermined number of operations may be completed without effecting the interruption of the circuit.

2. In a productometer the combination of a main drive shaft, an indicating device arranged to be driven by said shaft and including a spindle, means normally holding said spindle in operative relation with the shaft including an electromagnet, a switch for controlling the flow of current from the source of electric energy to said magnet, and means for actuating said switch at the expiration of a predetermined interval of time, said means including a member arranged to be driven by said spindle, and means for disconnecting said member from the spindle upon the completion of a predetermined number of operations of the machine whose production is being indicated.

3. A controller mechanism for production measuring machines including an electromagnet having an armature, a member driven at a uniform rate of speed for controlling an electric circuit, a ratchet wheel having a deep tooth and arranged to be actuated in the reciprocation of said armature, and a latch member controlled by the operation of the ratchet wheel and adapted when engaging the deep tooth of the latter to permit the armature to interrupt the travel of said member.

4. A productometer having an indicating device and a controller mechanism therefor including a electromagnet having an armature, a ratchet wheel carried by the armature, a stationary pawl engaging with the ratchet wheel adapted to effect the rotation of the latter in the reciprocation of the armature, a circuit controlling member arranged to be driven at a uniform rate of speed, and means controlled by the operation of said ratchet wheel for limiting the movement of said member.

5. In a productometer the combination of an indicating device, a controller mechanism for said device including a spindle driven at a uniform rate of speed, a member having a connection with said spindle, an electromagnet having an armature, and means operable in the movement of said armature to move said spindle out of operative connection with its driving means.

6. In a productometer, the combination of an indicating device, a controller mechanism for said edvice including a spindle driven at a uniform rate of speed, a member having a connection with said spindle, an electromagnet having an armature, and means operable in the movement of said armature to move said spindle out of operative connection with its driving means, said spindle having a spring normally resisting such movement and acting to restore said member to a predetermined position.

7. The combination with an indicating device, of a controller mechanism therefor including a member arranged to be driven through a predetermined path of travel, said member being in the form of a disk having a stop thereon, and means for determining the initial position of said stop including a dial member arranged for adjustment at the will of the operator.

8. The combination with an indicating device, of a controller mechanism therefor including a spindle driven at a uniform rate of speed, a member having a gearing connection with the spindle and movable in a direction parallel thereto, means for determining the length of travel of said member including a disk arranged coaxially of said member but rotatable independently thereof, and spring means acting upon said spindle to move said member into a position determined by said disk.

9. In a productometer, a controller mechanism including a member arranged to be driven, and means for determining the extent of travel of said member including a dial, coacting stops on said dial and said member, means for holding the dial in its set position, and spring means tending to move said member in a direction such that the coacting stops determine the initial position of the member.

10. The combination set forth in claim 9 wherein the dial is provided with serrated edges, and the means for holding the dial comprises a pointer arranged to engage with the serrated edge.

11. A productometer comprising, in combination, a registering device, a constantly-driven shaft, electromagnetic means operable to move the registering device into operative engagement with said shaft, and a control device including a circuit breaker driven in timed relation to said shaft and adapted to control said electromagnet, and electromagnetically actuated means controlled by the operation of said machine for interrupting the travel of said circuit breaker when the productive rate of the machine falls below a predetermined minimum.

12. A productometer comprising a constantly-driven shaft, a registering device, means for moving the registering device into operative connection with the shaft including an electromagnet, and a controller mechanism for the registering device including a switch, an element normally operating in timed relation to said shaft and normally operable at a predetermined point in its travel to open said switch, and means operable to interrupt the travel of said control element preliminary to the normal operation of said switch, the last mentioned means being controlled by the operation of the machine whose production is being recorded.

13. An apparatus for registering the productive capacity of a machine or the like comprising, in combination, a time indicator, a shaft driven at a substantially constant speed, an electromagnet associated with said time indicator and adapted to move it into operative association with said shaft, a switch controlling the flow of current to said indicator magnet, a control device having a control element driven from said shaft and normally operable at a predetermined point to actuate said switch so as to interrupt the operation of the time indicator, said device having a control magnet, a second switch controlled by the operation of said machine and serving to govern the flow of current to said control magnet, and means operable by said control magnet to interrupt the travel of the control element when the rate of production of said machine exceeds a predetermined minimum.

14. An apparatus for registering the productive capacity of a machine or the like comprising, in combination, a time indicator, a shaft driven at a substantially constant speed, an electromagnet associated with said time indicator and adapted to effect an operative connection between the indicator and said shaft, a switch controlling the flow of current to said indicator magnet, a control device having a control element driven from said shaft and normally operable at a predetermined point to actuate said switch so as to interrupt the operation of the time indicator, said device having a control magnet, a second switch controlled by the operation of said machine and serving to govern the flow of current to the control magnet, and means operable by said control magnet to interrupt the travel of the control element when the rate of production of said machine exceeds a predetermined minimum.

In testimony whereof, I have hereunto affixed my signature.

PETER A. COONEY.